(12) United States Patent
Hiroki et al.

(10) Patent No.: US 12,241,905 B2
(45) Date of Patent: Mar. 4, 2025

(54) AUTOMATIC ANALYSIS DEVICE AND AUTOMATIC ANALYSIS METHOD

(71) Applicant: Hitachi High-Tech Corporation, Tokyo (JP)

(72) Inventors: Kohei Hiroki, Tokyo (JP); Akihiro Yasui, Tokyo (JP); Takeshi Setomaru, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 960 days.

(21) Appl. No.: 17/295,151

(22) PCT Filed: Feb. 4, 2020

(86) PCT No.: PCT/JP2020/004088
§ 371 (c)(1),
(2) Date: May 19, 2021

(87) PCT Pub. No.: WO2020/183982
PCT Pub. Date: Sep. 17, 2020

(65) Prior Publication Data
US 2022/0018867 A1 Jan. 20, 2022

(30) Foreign Application Priority Data
Mar. 11, 2019 (JP) .................. 2019-043392

(51) Int. Cl.
*B01L 3/00* (2006.01)
*A61L 27/16* (2006.01)
(Continued)

(52) U.S. Cl.
CPC ..... *G01N 35/04* (2013.01); *G01N 2035/0415* (2013.01); *G01N 2035/0441* (2013.01); *G01N 2035/0465* (2013.01)

(58) Field of Classification Search
CPC .......... G01N 35/04; G01N 2035/0415; G01N 2035/0441; G01N 2035/0465; G01N 35/025; G01N 35/026
See application file for complete search history.

(56) References Cited

U.S. PATENT DOCUMENTS

2011/0250091 A1   10/2011   Kaiga et al.
2011/0256022 A1   10/2011   Akutsu et al.
(Continued)

FOREIGN PATENT DOCUMENTS

EP   2 620 776 A1   7/2013
JP   2002-323505 A   8/2002
(Continued)

OTHER PUBLICATIONS

English Machine Translation of WO2018221220A1, obtained from Google Patents on Jul. 17, 2024, pp. 1-8. (Year: 2024) (Year: 2024).*

(Continued)

*Primary Examiner* — Jennifer Wecker
*Assistant Examiner* — Oyeleye Alexander Alabi
(74) *Attorney, Agent, or Firm* — MATTINGLY & MALUR, PC

(57) ABSTRACT

In an automatic analysis device, it is possible during specimen analysis to add/deposit one rack at a time without stopping the analysis, and it is easy to ascertain the analysis sequence. The analyzer has an analysis module, a rack transport module for transporting a specimen rack in which a specimen container storing a specimen is loaded, and a control device. The rack transport module includes a rack supply part for supplying a specimen rack, a rack accommodating part for accommodating a specimen rack, a rack transport line for transporting a specimen rack supplied from the rack supply part, a dispensing line for transporting a
(Continued)

specimen rack to the analysis module, and a rack rotor for transferring a specimen rack between the rack transport line and the dispensing line. Operation of the rack supply part for supplying a specimen rack can be stopped independently of the operation of the analysis module.

8 Claims, 6 Drawing Sheets

(51) Int. Cl.

| | | |
|---|---|---|
| *A61L 27/56* | (2006.01) | |
| *B01F 23/00* | (2022.01) | |
| *B01F 23/41* | (2022.01) | |
| *B01F 101/23* | (2022.01) | |
| *B01L 7/00* | (2006.01) | |
| *B01L 9/00* | (2006.01) | |
| *B23Q 17/24* | (2006.01) | |
| *C07K 14/705* | (2006.01) | |
| *C08F 220/56* | (2006.01) | |
| *C08L 33/26* | (2006.01) | |
| *C12M 1/34* | (2006.01) | |
| *C12Q 1/04* | (2006.01) | |
| *C12Q 1/18* | (2006.01) | |
| *C12Q 1/6844* | (2018.01) | |
| *C12Q 1/686* | (2018.01) | |
| *G01N 1/31* | (2006.01) | |
| *G01N 21/17* | (2006.01) | |
| *G01N 21/3577* | (2014.01) | |
| *G01N 21/359* | (2014.01) | |
| *G01N 21/39* | (2006.01) | |
| *G01N 21/45* | (2006.01) | |
| *G01N 21/64* | (2006.01) | |
| *G01N 21/77* | (2006.01) | |
| *G01N 21/78* | (2006.01) | |
| *G01N 27/414* | (2006.01) | |
| *G01N 30/12* | (2006.01) | |
| *G01N 30/68* | (2006.01) | |
| *G01N 30/70* | (2006.01) | |
| *G01N 30/72* | (2006.01) | |
| *G01N 30/88* | (2006.01) | |
| *G01N 33/00* | (2006.01) | |
| *G01N 33/18* | (2006.01) | |
| *G01N 33/50* | (2006.01) | |
| *G01N 33/53* | (2006.01) | |
| *G01N 33/543* | (2006.01) | |
| *G01N 33/68* | (2006.01) | |
| *G01N 33/74* | (2006.01) | |
| *G01N 35/00* | (2006.01) | |
| *G01N 35/04* | (2006.01) | |
| *G01N 35/10* | (2006.01) | |
| *G06T 7/00* | (2017.01) | |
| *G06T 7/90* | (2017.01) | |
| *H10K 10/46* | (2023.01) | |
| *H10K 85/00* | (2023.01) | |
| *H10K 85/20* | (2023.01) | |

(56) References Cited

U.S. PATENT DOCUMENTS

| | | |
|---|---|---|
| 2012/0222502 A1 | 9/2012 | Nakano et al. |
| 2013/0195720 A1* | 8/2013 | Behnk .................. G01N 35/026 422/68.1 |
| 2020/0264201 A1 | 8/2020 | Makino et al. |

FOREIGN PATENT DOCUMENTS

| | | |
|---|---|---|
| JP | 2010-139371 A | 6/2010 |
| JP | 2010-151569 A | 7/2010 |
| JP | 2010-181197 A | 8/2010 |
| JP | 2012-185001 A | 9/2012 |
| JP | 2019-211372 A | 12/2019 |
| WO | 2015/083236 A1 | 6/2015 |
| WO | 2018/163674 A1 | 9/2018 |
| WO | 2018/221220 A1 | 12/2018 |

OTHER PUBLICATIONS

Labospect 006 (online), Catalog etc. Issue Date: May 2016, Retrieved Mar. 6, 2020, Japanese Association of Clinical laboratory System, Internet: <URL:https://jaclas.or.jp/Product/index?id=86264>, "Rack Insertion Method" (Hitachi Automatic Analyzer Labospect 006.).
International Search Report of PCT/JP2020/004088 dated Mar. 24, 2020.
Extended European Search Report received in corresponding European Application No. 20769315.1 dated Nov. 2, 2022.

\* cited by examiner

[FIG. 1]
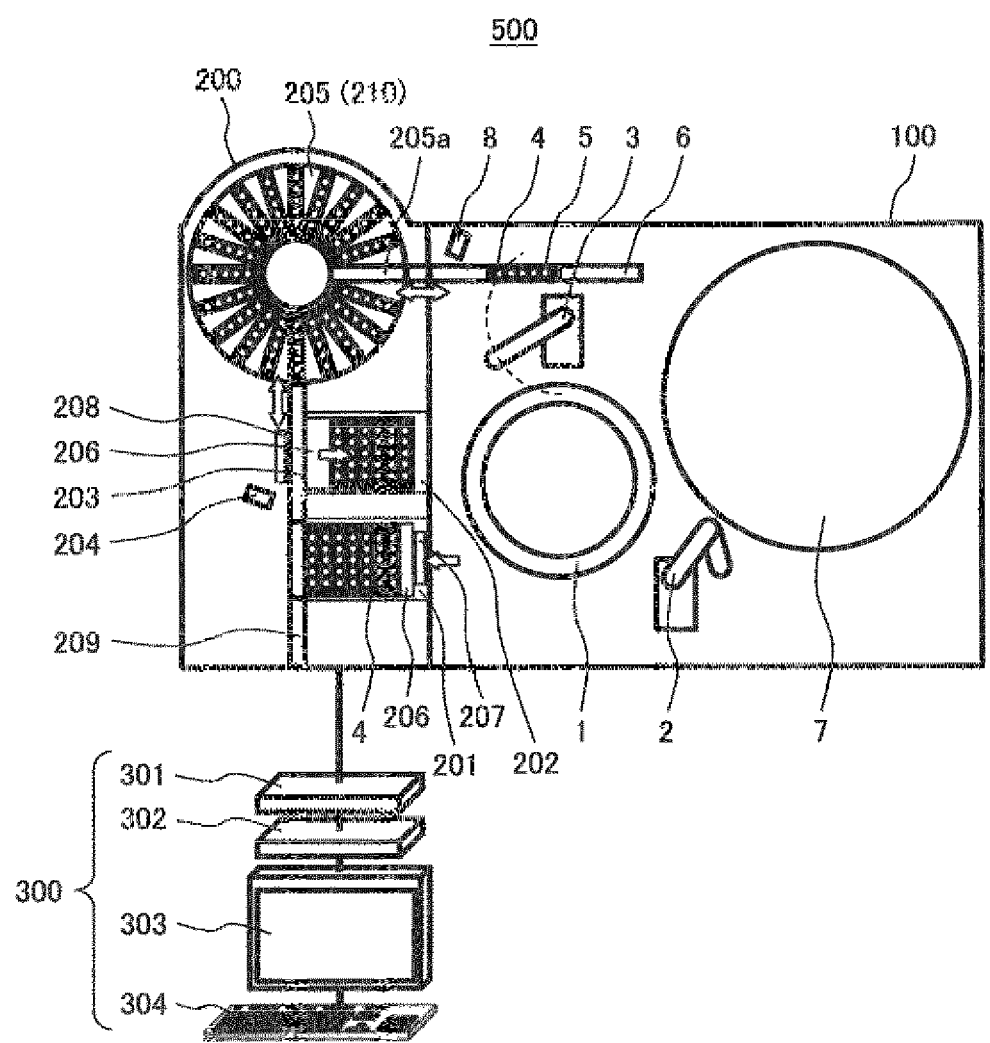

[FIG. 2]
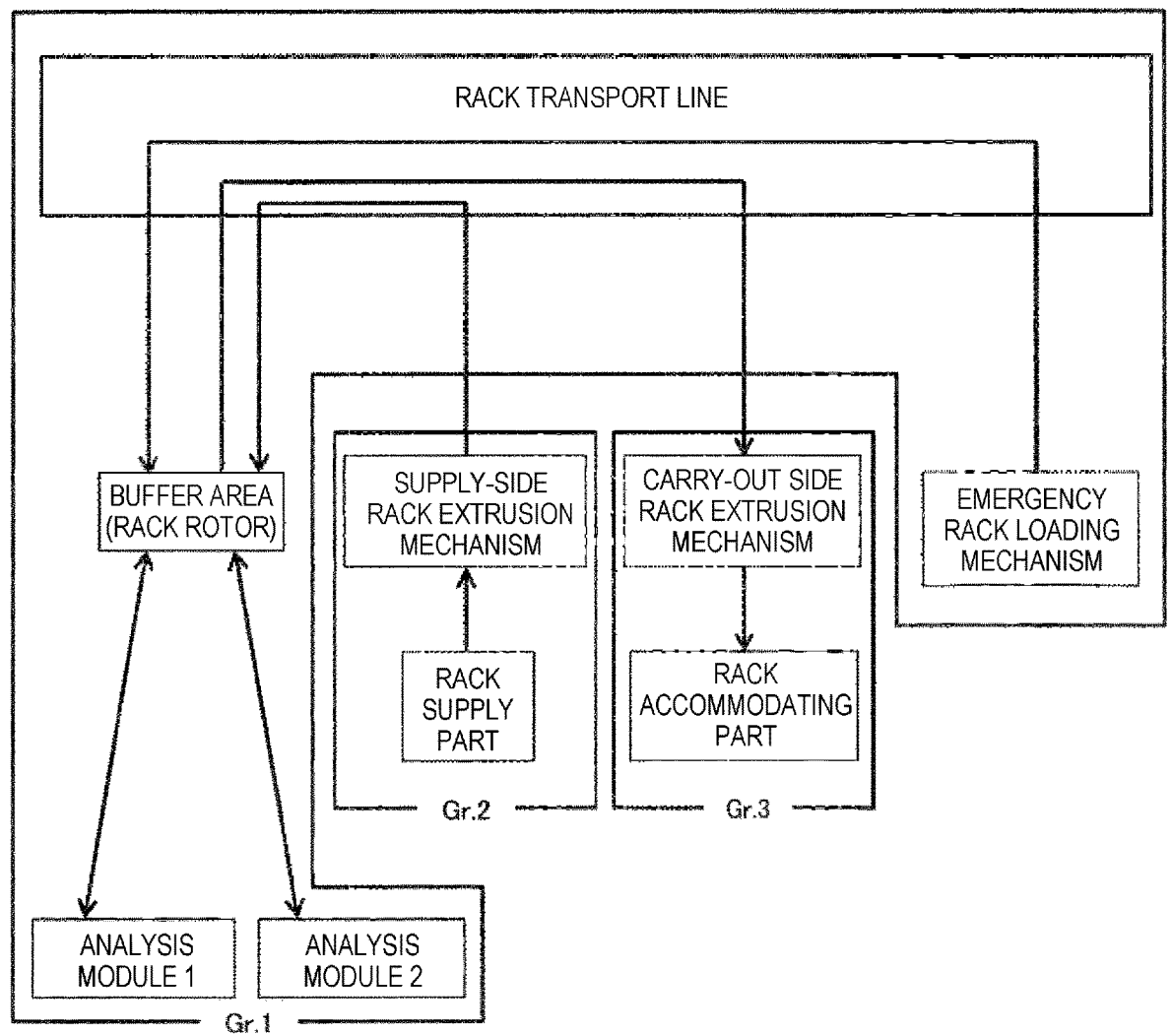

[FIG. 3]
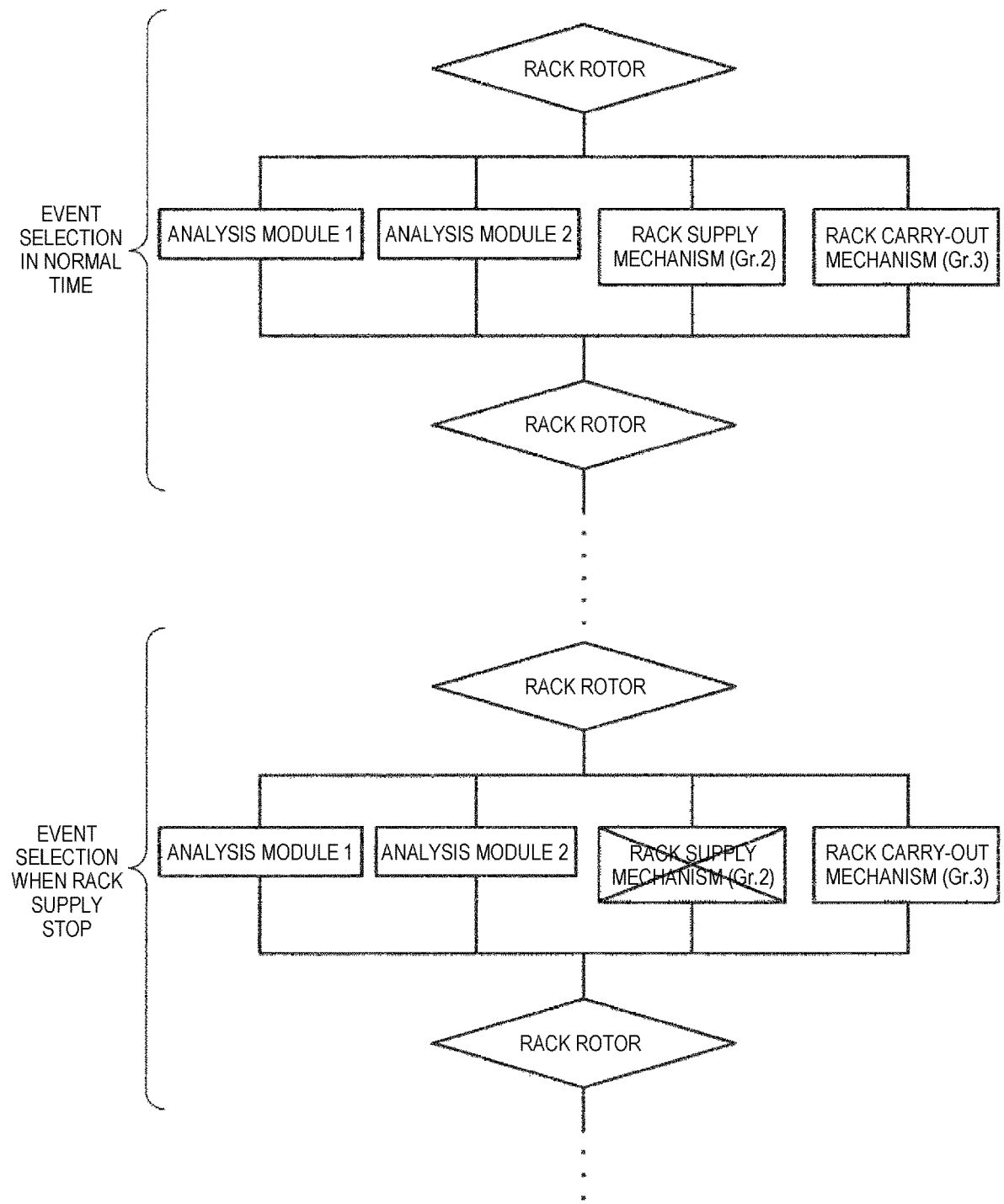

[FIG. 4]
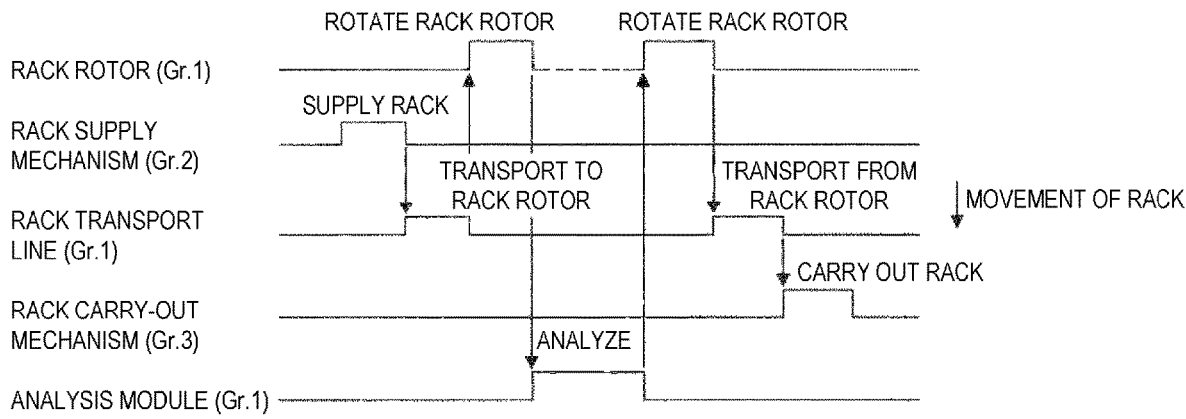
[FIG. 5]
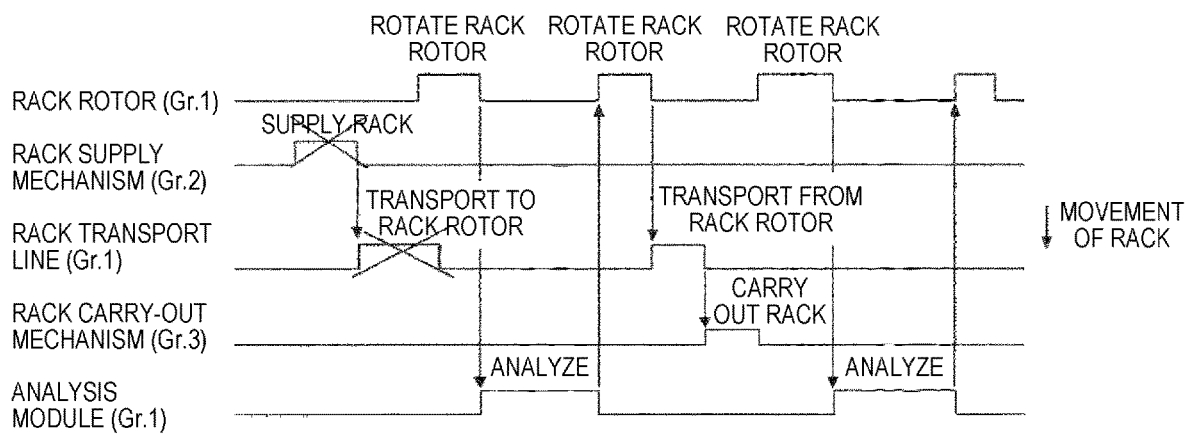
[FIG. 6]
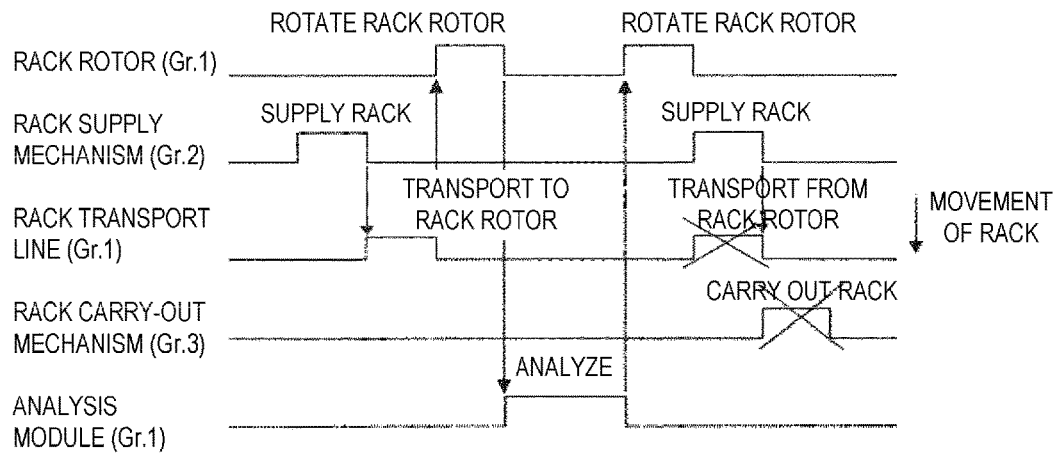

[FIG. 7]
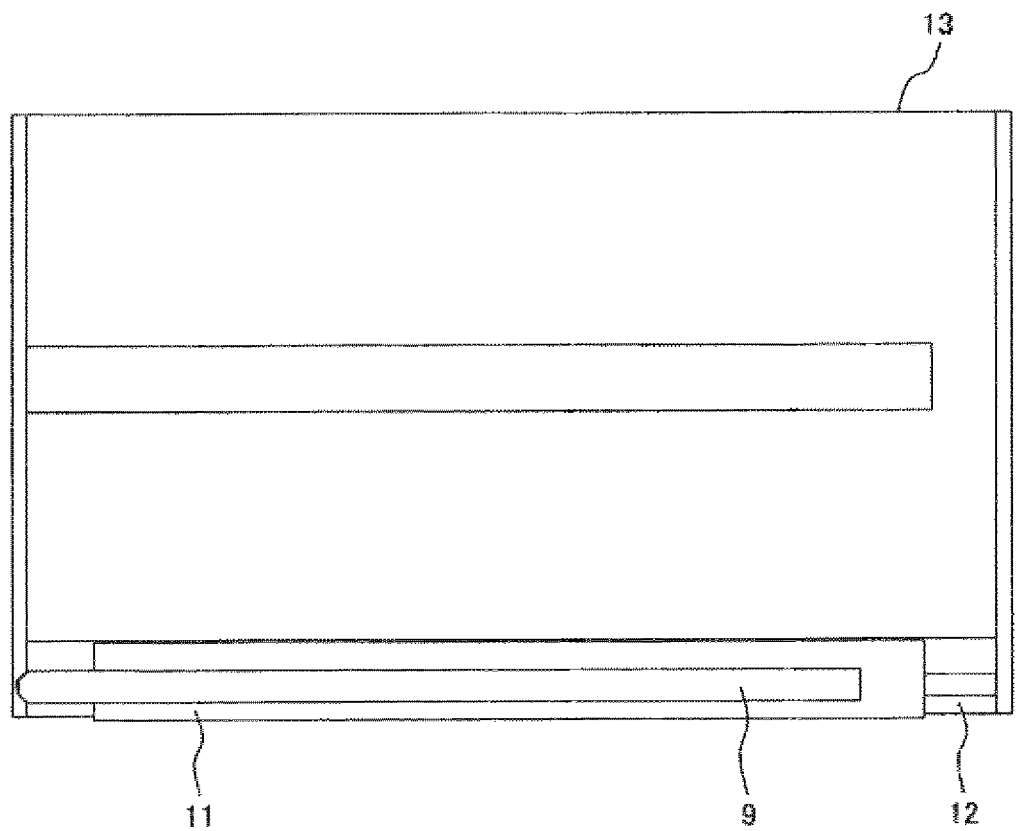

[FIG. 8]
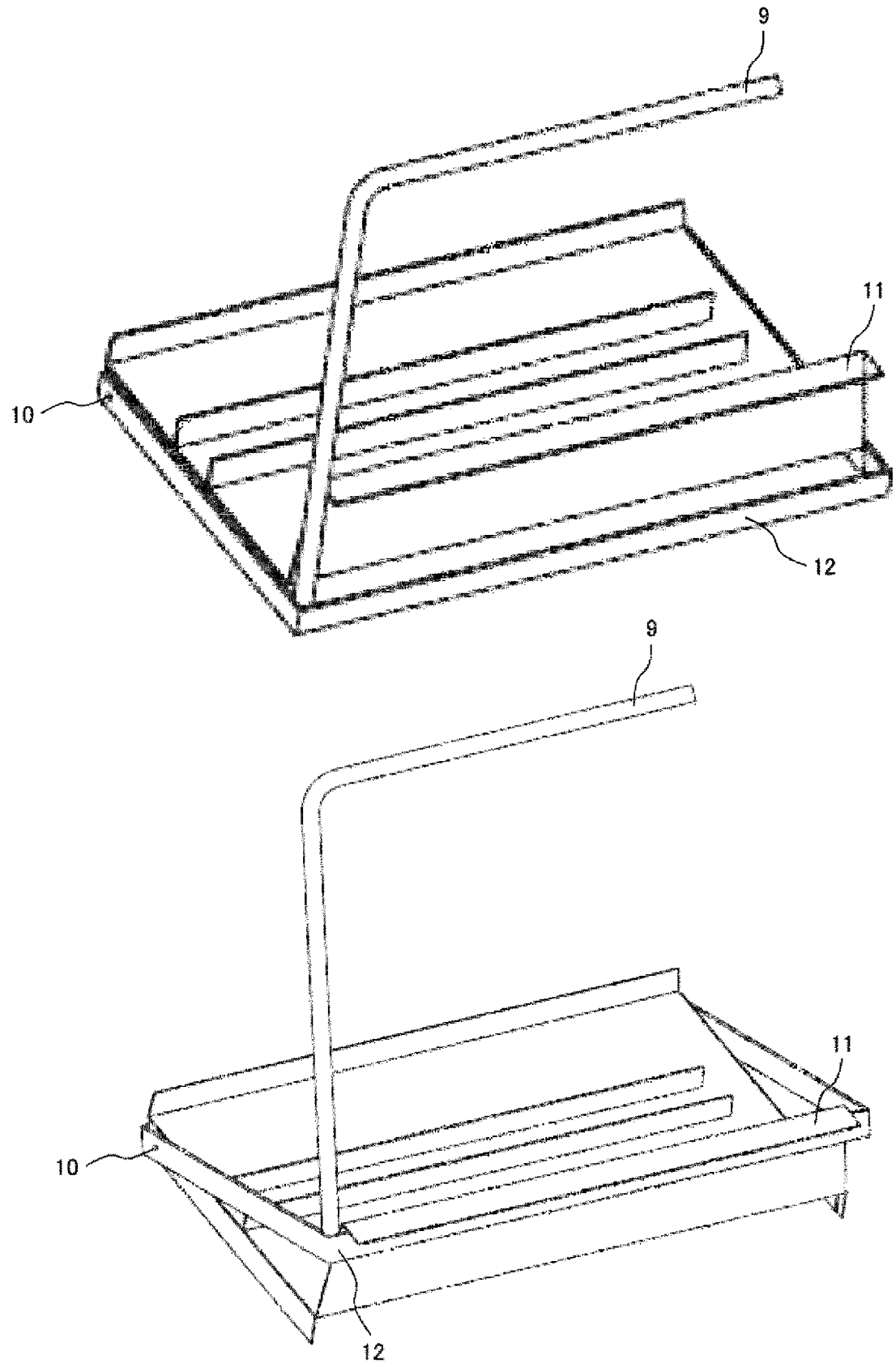

AUTOMATIC ANALYSIS DEVICE AND AUTOMATIC ANALYSIS METHOD

TECHNICAL FIELD

The present invention relates to an automatic analysis device that performs quantitative and qualitative analysis of a biological sample such as blood or urine, and more particularly to an automatic analysis system including a transport device that transports a sample container to an analysis device.

BACKGROUND ART

An automatic analysis device that performs quantitative or qualitative analysis of specific components contained in a biological sample such as blood or urine is indispensable for current diagnosis due to a reproducibility of an analysis result and a high processing speed.

A measurement method of the automatic analysis device is roughly classified into an analysis method (colorimetric analysis) that uses a reagent that reacts with an analysis target component in a sample and changes a color of a reaction solution, and an analysis method (immunological analysis) that counts a labeled substance using a reagent in which the labeled substance is added to a substance that specifically binds directly or indirectly to a target component.

In addition, samples carried to the automatic analysis device are roughly classified into whether the samples are supplied to the automatic analysis device or sample containers are set directly in an analyzer depending on a manner in which a plurality of sample containers called racks are loaded from a transport module that supplies, transports, holds, and carries out the samples and is different from the analyzer.

In recent automatic analysis devices, an analysis device including a former transport module is a mainstream, and this rack is loaded on a tray called a rack tray and provided in a transport unit.

As a background technique in this technical field, for example, there is a technique such as PTL 1. PTL 1 discloses an automatic analysis device that is provided with a buffer device that holds the rack separately from a normal rack supply position, and that enables the rack to be provided and collected directly on the buffer device.

CITATION LIST

Patent Literature

PTL 1: JP-A-2010-151569

SUMMARY OF INVENTION

Technical Problem

Meanwhile, in the automatic analysis device in the related art, when it is desired to additionally load a rack other than an emergency rack, it is necessary to wait until all the racks are discharged from a transport line. A reason is that when the rack is added as the emergency rack, a specimen rack currently waiting for analysis is overtaken and an analysis order is changed. Further, when it is desired to additionally load the rack in the middle of the analysis, it is necessary to remove the rack tray and additionally load the rack after stopping the analysis.

Further, in a small automatic analysis device, the number of the racks to be additionally loaded at one time is small, and it is often desired to additionally load the racks one by one. In this case, waiting for a rack collection to be completed and then additionally loading the racks for each rack tray increase a waiting time or a labor of a user.

According to the above PTL 1, by providing the buffer device including a plurality of independent slots that can temporarily hold the specimen rack on standby, a temporary removal of a specimen under the analysis can be achieved, and as a result, additional items can be quickly measured for the specimen.

However, in PTL 1, it is necessary to provide a module dedicated to a buffer, which causes problems such as an increase in size of a device or a complicated order of analysis of the specimen.

Therefore, an object of the invention is to provide an automatic analysis device and an automatic analysis method in which racks can be additionally loaded one by one without stopping analysis even during the analysis of a specimen with a minimum necessary device configuration, and an order of the analysis can be easily grasped.

Solution to Problem

In order to solve the problems, the invention provides an automatic analysis device, which includes: an analysis module configured to analyze a specimen; a rack transport module configured to transport a specimen rack in which a specimen container storing the specimen is loaded; and a control device configured to control operations of the analysis module and the rack transport module. The rack transport module includes: a rack supply part configured to supply the specimen rack; a rack accommodating part configured to accommodate the specimen rack; a rack transport line configured to transport the specimen rack supplied from the rack supply part; a dispensing line configured to transport the specimen rack to the analysis module; and a rack rotor configured to transfer the specimen rack between the rack transport line and the dispensing line. The rack supply part is configured such that the specimen rack is able to be loaded into the rack transport line using a rack tray on which a plurality of specimen racks are able to be loaded. The rack accommodating part is configured such that the specimen rack transported from the rack transport line is able to be accommodated using the rack tray. The rack tray is a cantilever rack tray including a cantilever-shaped handle that allows an operator to additionally load a specimen rack from the front.

In addition, the invention provides an automatic analysis method that analyzes a specimen, which includes: setting a specimen rack on which a specimen container storing a specimen is loaded in a rack supply part; transporting the specimen rack supplied from the rack supply part to an analysis module via a rack transport line, a rack rotor, and a dispensing line; starting an analysis of the specimen in the analysis module; stopping the supply of the specimen rack from the rack supply part while continuing the analysis of the specimen in the analysis module. The rack supply part is configured such that the specimen rack is able to be loaded into the rack transport line using a rack tray on which a plurality of specimen racks are able to be loaded. The rack accommodating part is configured such that the specimen rack transported from the rack transport line is able to be accommodated using the rack tray. The rack tray is a cantilever rack tray including a cantilever-shaped handle that allows an operator to additionally load a specimen rack from the front.

Advantageous Effect

According to the invention, it is possible to realize the automatic analysis device and the automatic analysis method in which the racks can be additionally loaded one by one without stopping the analysis even during the analysis of the specimen with the minimum necessary device configuration, and the order of the analysis can be easily grasped.

Problems, configurations and effects other than the above will be apparent with reference to the description of the following embodiments.

BRIEF DESCRIPTION OF DRAWINGS

FIG. 1 is a diagram showing a schematic configuration of an automatic analysis device according to a first embodiment.

FIG. 2 shows a functional block diagram of the automatic analysis device according to the first embodiment and an example of grouping for each control.

FIG. 3 is a flowchart showing an example of event selection of the automatic analysis device according to the first embodiment.

FIG. 4 is a timing chart showing an operation of a transport unit during a normal operation of the automatic analysis device according to the first embodiment.

FIG. 5 is a timing chart showing an operation of the transport unit when an operation of a rack supply stop of the automatic analysis device according to the first embodiment is performed.

FIG. 6 is a timing chart showing an operation of the transport unit when an operation of a rack carry-out stop of the automatic analysis device according to a third embodiment is performed.

FIG. 7 is a plan view showing a shape of a rack tray according to a second embodiment.

FIG. 8 is a perspective view showing the shape of the rack tray according to the second embodiment.

DESCRIPTION OF EMBODIMENTS

Hereinafter, embodiments of the invention will be described with reference to the drawings. In the drawings, the same configurations are denoted by the same reference numerals, and a detailed description of repeated parts will be omitted.

Further, in the following embodiments, it is needless to say that constituent elements (including element steps or the like) are not necessarily essential unless otherwise particularly specified or in principle considered to be obviously essential.

First Embodiment

An automatic analysis device and an automatic analysis method according to a first embodiment of the invention will be described with reference to FIGS. 1 to 5. FIG. 1 shows an example of an overall configuration of an automatic analysis device 500 of the present embodiment. The automatic analysis device 500 is a device for quantitatively or qualitatively analyzing specific components contained in a biological sample (specimen) such as blood or urine provided by a patient, and is schematically configured by an analysis module 100, a rack transport module 200 for transporting a specimen rack 4 in which one or more specimen containers storing a specimen to be analyzed by the analysis module 100 are loaded, and a control device 300 for controlling an operation of the entire automatic analysis device 500.

Although FIG. 1 describes a configuration in which the automatic analysis device 500 includes one analysis module 100, a plurality of analysis modules 100 may be provided. Hereinafter, a configuration of each module will be described.

The analysis module 100 is a module that dispenses the specimen stored in a specimen container 5 loaded on the specimen rack 4 into a reaction container (not shown) on a reaction disk 1, and quantitatively or qualitatively analyzes the specimen by a detection system formed of a light source and a photometer (not shown) after the specimen is mixed with a reagent.

Examples of an analysis method include a colorimetric analysis that uses a reagent that changes a color thereof by reacting with the specific components in the specimen, and an immunological analysis that counts a labeled substance using a reagent in which the labeled substance is added to a substance that binds directly or indirectly to the specific components in the specimen. The analysis module 100 mainly includes the reaction disk 1, a reagent disk 7, a dispensing line 6, a specimen dispensing mechanism 3, a reagent dispensing mechanism 2, and a specimen identification device 8.

The dispensing line 6 carries in the specimen rack 4 transported from a rack rotor 205 from one end, and reciprocates from the specimen container 5 to a dispensing position for dispensing the specimen by the specimen dispensing mechanism 3. That is, a reciprocatable transport mechanism that pulls the specimen rack 4 from the rack transport module 200 to the analysis module 100 and delivers the specimen rack 4 from the analysis module 100 to the rack transport module 200 is adopted.

In the present embodiment, a case where a belt conveyor type transport mechanism is adopted as the dispensing line 6 is illustrated, but a configuration may be adopted in which a protrusion structure driven along the dispensing line 6 is fitted into a recess provided in advance in the specimen rack 4 and transported.

The specimen identification device 8 reads an identification medium (not shown) such as a radio frequency identification (RFID) or a barcode attached to the specimen container 5 and the specimen rack 4. The specimen identified by the specimen identification device 8 is dispensed to the reaction disk 1 by the specimen dispensing mechanism 3. The reagent is dispensed by the reagent dispensing mechanism 2 from a reagent container (not shown) of the reagent disk 7 to the reaction container into which the specimen on the reaction disk 1 is dispensed. A mixed solution of the specimen and the reagent is called a reaction solution. The reaction solution dispensed into the reaction container is quantitatively or qualitatively analyzed by the detection system formed of the light source and the photometer (not shown).

The rack transport module 200 transports the specimen rack 4 loaded into the automatic analysis device 500 to and from the analysis module 100, and includes a belt conveyor type rack transport line 203 that, for example, reciprocates the specimen rack 4, an emergency rack loading part 209 that is provided adjacent to the rack transport line 203 and that is used for loading an emergency specimen rack (not shown), a rack supply part 201 that is provided adjacent to the rack transport line 203 on one end side of the rack transport line 203 with respect to the emergency rack loading part 209 and that is used for supplying the specimen rack 4 of a normal specimen, a rack accommodating part 202 that is provided adjacent to the rack transport line 203 on one end side of the rack transport line 203 with respect to the rack supply part 201 and that is used for accommodating the specimen rack 4, an emergency specimen rack standby area 210 that is provided on the rack transport line 203 on the other end side of the rack transport line 203 with respect to the rack accommodating part 202 and that is used for temporarily waiting the emergency specimen rack, a rack rotor 205 that is arranged at one end of the rack transport line 203, includes one or more slots 205a on which the specimen racks 4 can be loaded, and transfers the specimen rack 4 between one end of the rack transport line 203 and one end of the dispensing line 6, and a specimen identification device 204 that reads and identifies the identification medium such as the RFID, or the barcode provided in the specimen rack 4 and the specimen container 5 in order to inquire analysis request information on the specimen stored in the specimen container 5 loaded on the specimen rack 4 transported by the rack transport line 203.

In FIG. 1, the rack rotor 205 is shown as a configuration having a function of the emergency specimen rack standby area 210.

A supply-side rack extrusion mechanism 207 that extrudes the specimen rack 4 such that the specimen rack 4 is supplied from the rack supply part 201 to the rack transport line 203, and a carry-out side rack extrusion mechanism 208 that extrudes the specimen rack 4 such that the specimen rack 4 is carried out from the rack transport line 203 to the rack accommodating part 202 are provided in the rack supply part 201 and the rack accommodating part 202, respectively.

The specimen racks 4 loaded on the rack supply part 201 and the rack accommodating part 202 are set by a tray called a rack tray 206, which will be described later in FIGS. 7 and 8, on which a plurality of specimen racks can be loaded.

The specimen rack 4 loaded into the rack supply part 201 is set in the rack transport line 203 by the supply-side rack extrusion mechanism 207, and is transported to the rack rotor 205 by the rack transport line 203. The specimen container 5 loaded on the specimen rack 4 transported on the rack transport line 203 is identified by reading the identification medium by the specimen identification device 204.

The rack rotor 205 includes a plurality of slots on which the specimen racks 4 are loaded, and transfers the specimen rack 4 between the dispensing line 6 of the analysis module 100 and the slots 205a. Similarly, the specimen rack 4 is also transferred between the rack transport line 203 in the rack transport module 200 and the slots 205a of the rack rotor 205. The specimen rack 4 collected from the analysis module 100 is accommodated in the rack accommodating part 202 by the carry-out side rack extrusion mechanism 208 from the rack transport line 203.

In addition, the emergency specimen rack is loaded from the emergency rack loading part 209. The emergency specimen rack overtakes a currently set analysis order of the racks, and is transported to the analysis module 100 with a highest priority, and the analysis is executed.

The control device 300 is a device for controlling an operation of the automatic analysis device, and includes a control unit 301, a storage unit 302, a display unit 303, and an input unit 304. The display unit 303 is a liquid crystal display or the like, and displays a screen for setting various parameters, an analysis result, or the like. The input unit 304 is a keyboard, a mouse, a touch panel, or the like, and is used for setting the various parameters, inputting information on the analysis, instructing start of the analysis, or the like. The storage unit 302 is a memory, a hard disk, a solid state drive (SSD), or the like, and stores the various parameters, the information on the analysis, the analysis result, or the like. The control unit 301 is a central processing unit (CPU) or the like, and executes control of an operation of each unit, calculation related to the control, or the like.

FIG. 2 shows a flow of rack delivery for each mechanism. Gr.1, Gr.2, and Gr.3 are independent and can be controlled individually.

The specimen rack 4 loaded into the rack supply part 201 is carried to the rack rotor 205, which is a buffer area, through the rack transport line 203 by the supply-side rack extrusion mechanism 207. The rack carried to the rack rotor 205 is transported to the analysis module 100 as needed. [Gr.2→Gr.1]

After the analysis is completed, the specimen rack 4 is returned to the rack rotor 205, passes through the rack transport line 203 again, and is carried in front of the carry-out side rack extrusion mechanism 208. After that, the specimen rack 4 can be taken out by being extruded by the carry-out side rack extrusion mechanism 208. [Gr.1 →Gr.3]

In a case of a rack supply stop, a mechanism of Gr.2 stops operating. However, since mechanisms of Gr.1 and Gr.3 are controlled independently, an operation of transporting the specimen rack 4 stored in the rack rotor 205 to the analysis module 100, an operation of carrying out the specimen rack 4 to the rack accommodating part 202, and an operation of transporting the emergency rack are continuously performed. When the rack supply stop is released, the mechanism of Gr.2 starts to operate again, and a loading operation of the specimen rack 4 is restarted.

Accordingly, in the present embodiment, when it is desired to additionally load the racks in a normal analysis order, the rack supply stop is input from the input unit 304 to stop the supply, an operation of the supply-side rack extrusion mechanism 207 is stopped, and the specimen rack 4 can be additionally loaded. At this time, by independently controlling Gr.2, the rack transport line 203, the rack rotor 205, and the carry-out side rack extrusion mechanism 208 other than a rack supply mechanism can continue to operate without stopping the operation and continue the analysis. A required number of the specimen racks 4 are additionally loaded, and after completion, the rack supply stop is released and the supply of the specimen rack 4 is restarted.

Accordingly, unlike the case where the specimen rack 4 is added from the emergency rack loading part 209, it is possible to newly and additionally load the specimen rack 4 without overtaking the specimen rack 4 currently waiting for the analysis.

On the other hand, when the emergency rack is loaded from the emergency rack loading part 209, the analysis is performed with the highest priority, overtaking the normal analysis order.

FIG. 3 is a flowchart of an event selection showing an example of the present embodiment. As shown in an upper figure of FIG. 3, in normal time, an event is set every few seconds, and according to the event, a rotation of the rack rotor 205 and an exchange of the specimen rack 4 with each mechanism in a descending order of priority are alternately performed.

On the other hand, as shown in a lower figure of FIG. 3, at the time of the rack supply stop, the rack supply mechanism (Gr.2) is erased (masked) from the event, events of the rack rotor 205, the analysis module 100, and a rack carry-out mechanism (Gr.3) remain, and the exchange of the specimen rack 4 is performed in the descending order of the priority. When the rack supply stop is released, the event returns and returns to a normal operation again.

FIG. 4 is a timing chart showing an operation of the rack transport module 200 during the normal operation. When the specimen rack 4 is set in a rack tray 13 (206) and the analysis is started, the specimen rack 4 is sent to the rack transport line 203 by the supply-side rack extrusion mechanism 207. The specimen rack 4 sent to the rack transport line 203 is carried to the rack rotor 205 by the rack transport line 203. A transport method of the rack transport line 203 includes a configuration in which the protrusion structure is fitted into the recess provided in advance on a bottom surface of the specimen rack 4 and transported, or a method of carrying in a form of a belt conveyor.

The specimen rack 4 carried to the rack rotor 205 is held in the slots 205a of the rack rotor 205 until it is a turn of the analysis. The specimen rack 4 that has come to the analysis turn moves to a delivery position with the dispensing line 6 of the analysis module 100 by rotating the rack rotor 205. At this time, the rack rotor 205 rotates in a direction in which a rotation distance is shorter due to a forward rotation and a reverse rotation. The specimen rack 4 held in the rotated slot 205a is carried into the analysis module 100 by the dispensing line 6 of the analysis module 100, and is returned to the rack rotor 205 after a dispensing operation by the specimen dispensing mechanism 3 is completed.

At this time, it is desirable that the specimen rack 4 returned to the rack rotor 205 is returned to the slots the same as the slots 205a used at the time of carrying in the analysis module 100 since the rack rotor 205 may be completely filled and the rack cannot be carried out. The specimen rack 4 returned to the rack rotor 205 is carried to the delivery position with the rack transport line 203 by the rotation of the rack rotor 205. After that, the specimen rack 4 is transported to the front of the rack accommodating part 202 by the rack transport line 203, and is extruded to the rack accommodating part 202 by the carry-out side rack extrusion mechanism 208.

FIG. 5 is a timing chart showing an operation of the rack transport module 200 during the rack supply stop. When it is desired to additionally load the specimen rack 4 during the analysis, the rack supply stop is input from the input unit 304. As an input method, for example, there are methods such as inputting from the keyboard, preparing and pressing a dedicated button, and inputting with the touch panel. When the rack supply is stopped, the operation of the supply-side rack extrusion mechanism 207 is stopped, and the specimen rack can be additionally loaded.

At this time, since Gr.1, Gr.2, and Gr.3 are independently controlled for each mechanism, the rack rotor 205 and the carry-out side rack extrusion mechanism 208 of the rack accommodating part 202 continue to operate. The rack rotor 205 transports the specimen rack 4 waiting for the analysis and held in the slot 205a by rotating the specimen rack 4 to a delivery location with the dispensing line 6 of the analysis module 100, and carries the specimen rack 4 into the analysis module 100 by the dispensing line 6, and the specimen is dispensed by the specimen dispensing mechanism 3.

The specimen rack 4 for which dispensing is completed is carried to the rack rotor 205 again and delivered to the rack transport line 203. The specimen rack 4 is carried to the rack accommodating part 202 by the rack transport line 203, and is carried out by the carry-out side rack extrusion mechanism 208. After the addition of the specimen rack 4 is completed, the rack supply is restarted again by releasing the rack supply stop.

Regarding instructions for the rack supply stop or the release of the rack supply stop, for example, it is conceivable that an icon is pressed by providing the icon for the rack supply stop or the release of the rack supply stop on an operation screen when the display unit 303 is the touch panel, or an LED switch is provided in a device such that a stop timing can be visually recognized, such as pressing the LED switch at the time of the supply stop, turning on a LED during the stop, and turning off the LED at the time of stop releasing.

Alternatively, it is also possible to automatically release the rack supply stop by detecting the number of the specimen racks with a sensor or the like.

That is, after the supply operation of the rack supply part 201 is stopped, the supply operation of the rack supply part 201 is restarted by a manual operation by an operator or when the number of the specimen racks 4 detected by the sensor (not shown) provided in the automatic analysis device 500 exceeds a predetermined threshold value.

In this way, when the specimen rack 4 is additionally loaded, only a rack supply operation is stopped independently of an analysis operation, so that a waiting time due to an additional operation of the specimen rack 4 can be reduced.

As described above, the automatic analysis device 500 of the present embodiment includes: the analysis module 100 for analyzing the specimen; the rack transport module 200 for transporting the specimen rack 4 in which the specimen container 5 storing the specimen is loaded; and the control device 300 for controlling the operation of the analysis module 100 and the rack transport module 200, the rack transport module 200 includes: the rack supply part 201 for supplying the specimen rack 4; the rack accommodating part 202 for accommodating the specimen rack 4; the rack transport line 203 for transporting the specimen rack 4 supplied from the rack supply part 201; the dispensing line 6 for transporting the specimen rack 4 to the analysis module 100; and the rack rotor 205 for transferring the specimen rack 4 between the rack transport line 203 and the dispensing line 6, and the operation of the rack supply part 201 for supplying the specimen rack 4 can be stopped independently of the operation of the analysis module 100.

Further, an operation of the rack accommodating part 202 accommodating the specimen rack 4 can be stopped independently of the operation of the analysis module 100.

In addition, in the automatic analysis method of the present embodiment, the specimen rack 4 on which the specimen container 5 storing the specimen is loaded is set in the rack supply part 201, the specimen rack 4 supplied from the rack supply part 201 is transported to the analysis module 100 via the rack transport line 203, the rack rotor 205, and the dispensing line 6, the analysis of the specimen is started with the analysis module 100, the supply of the specimen rack 4 from the rack supply part 201 is stopped while continuing the analysis of the specimen in the analysis module 100, and a specimen rack different from the specimen rack 4 set in the rack supply part 201 is additionally loaded into the rack transport line 203.

Further, while continuing the analysis of the specimen with the analysis module 100, the accommodation of the specimen rack 4 in the rack accommodating part 202 is stopped, and the additionally loaded specimen rack is accommodated (collected) from the rack transport line 203.

According to the present embodiment, it is possible to realize the automatic analysis device and the automatic analysis method in which the racks can be additionally loaded one by one without stopping the analysis even during the analysis of the specimen with the minimum necessary device configuration, and the order of the analysis can be easily grasped.

Second Embodiment

An automatic analysis device and an automatic analysis method according to a second embodiment of the invention will be described with reference to FIGS. 7 to 8. In the first embodiment, a configuration has been described in which the rack supply operation at the time of additionally loading the specimen rack 4 is stopped and the control is performed independently of the analysis operation to reduce the waiting time for the addition of the specimen rack 4. In the present embodiment, a mode in which a user can easily perform the additional operation of the specimen rack 4 by further making a rack tray shape on which the plurality of specimen racks 4 are loaded in a cantilever configuration will be described.

FIGS. 7 and 8 are examples of the rack tray shape in the present embodiment. FIG. 7 is a plan view of the rack tray 13, and FIG. 8 is a perspective view of the rack tray 13.

As shown in FIGS. 7 and 8, the rack tray 13 has a structure capable of loading the plurality of specimen racks 4 on which a plurality of specimen containers 5 for storing the specimens are loaded. Further, a rack tray handle 9 has a cantilever shape as a structure that facilitates the additional loading of the specimen rack 4 by the user. By shortening a side of the rack tray handle 9 where the specimen rack 4 is to be additionally loaded by at least one rack (for example, 20 mm or more if a rack width is 20 mm), the rack tray handle 9 has a shape that it is easy to additionally load the rack even from the front.

Further, since the cantilever shape reduces rigidity of the entire rack tray, the rigidity is strengthened by adding a folded-back part 11 to a metal shape connected to the rack tray handle 9. A loading base portion and a handle portion of the rack are connected by a shaft 10. Further, by providing a movable range limiting part 12, a movable range of the handle portion is limited, and the specimen rack 4 is prevented from being turned upside down.

A lower figure of FIG. 8 shows a state in which the rack tray 13 is lifted. When the user holds the rack tray handle 9 and lifts the rack tray 13, a metal connected to the rack tray handle 9 is lifted around the shaft 10. This serves to prevent the rack from falling laterally and to bring a position of the center of gravity above the rack.

In the present embodiment, in order to facilitate the additional loading of the specimen rack 4, the rack can be additionally loaded from the front by making the handle of the rack tray a cantilever structure and opening an upstream side of the supply-side rack extrusion mechanism 207.

While the automatic analysis device operates, the supply-side rack extrusion mechanism 207 stays on the rack tray 13 (206), so that the rack cannot be additionally loaded during the operation. Therefore, as described in the first embodiment, the supply-side rack extrusion mechanism 207 is eliminated from the rack tray 13 (206) by performing the control of the rack supply stop.

Therefore, it is possible to additionally load the rack. At this time, since the rack supply part 201 is independently controlled to stop the operation, the rack rotor 205, the rack accommodating part 202, and the analysis module 100 can continue to operate.

As described above, after stopping the supply operation of the rack supply part 201, the automatic analysis device 500 of the present embodiment can load the plurality of specimen racks 4, and additionally loads the specimen racks 4 into the rack transport line 203 using the cantilever rack tray 13 that is grippable by the operator (user) with one hand.

The plurality of specimen racks 4 can be loaded after stopping the accommodating operation of the rack accommodating part 202, and the specimen racks 4 are accommodated (collected) from the rack transport line 203 using the cantilever rack tray 13 that is grippable by the operator (user) with the one hand.

The automatic analysis device 500 of the present embodiment includes the supply-side rack extrusion mechanism 207 that extrudes the specimen rack 4 from the rack supply part 201 to the rack transport line 203, and the carry-out side rack extrusion mechanism 208 that extrudes the specimen rack 4 from the rack transport line 203 to the rack accommodating part 202, and is configured to take out the specimen rack 4 from the upstream side of the supply-side rack extrusion mechanism 207 or a downstream side of the carry-out side rack extrusion mechanism 208 using a rack tray having a shape the same as the cantilever rack tray 13.

According to the present embodiment, the racks to be added at any time can be easily added one by one.

Third Embodiment

An automatic analysis device and an automatic analysis method according to a third embodiment of the invention will be described with reference to FIG. 6. The first and second embodiments describe that the rack supply is stopped and a hardware configuration (the rack tray shape) is devised to facilitate the additional loading of the rack and reduce the waiting time for the user to add the rack.

In the present embodiment, by individually controlling the carry-out of the specimen rack 4, the specimen rack 4 can be carried out during the operation of the analysis module 100. Accordingly, for example, in a device configuration in which the plurality of analysis modules 100 (for example, a biochemical analysis device and an immunological analysis device) are connected to the rack rotor 205, when it is desired to perform the analysis on the specimen loaded on one specimen rack 4 with the plurality of analysis modules 100, immediately after the dispensing of the specimen is completed, the specimen rack 4 can be taken out and set in another analysis module 100.

Accordingly, the user can further reduce the waiting time even for an urgent specimen for which a plurality of analysis is desired to be performed. By adding and taking out the specimen rack 4 from the upstream side of the supply-side rack extrusion mechanism 207 in the rack supply part 201 of the specimen rack 4 and from the downstream side of the carry-out side rack extrusion mechanism 208 in the rack accommodating part 202, a shape of the rack tray can be made similar in the rack supply part 201 and the rack accommodating part 202, and the rack trays in the rack supply part 201 and the rack accommodating part 202 can be exchanged.

FIG. 6 is a timing chart showing an operation of the rack transport module 200 during the rack carry-out stop. This figure shows a chart in which the rack carry-out stop is already input and the operation of Gr.3 is stopped. When it is desired to carry out the specimen rack 4 from the rack tray 13 (206) during the analysis, the rack carry-out stop is input from the input unit 304.

As the input method, for example, there are methods such as inputting from the keyboard, preparing and pressing the dedicated button, and inputting with the touch panel. When the rack carry-out stop is performed, the operation of the carry-out side rack extrusion mechanism 208 is stopped, and the specimen rack 4 can be carried out.

Further, at this time, by stopping only Gr.3 independently, the rack rotor 205 and the supply-side rack extrusion mechanism 207 of the rack supply part 201 continue to operate. The rack rotor 205 transports the supplied specimen rack 4 by rotating the specimen rack 4 to the delivery location with the dispensing line 6 of the analysis module 100, and the analysis module 100 dispenses the specimen by the specimen dispensing mechanism 3.

The specimen rack 4 for which the dispensing is completed is carried to the rack rotor 205 again, and the specimen rack 4 is held by the rack rotor 205. After a necessary specimen rack 4 is carried out from the rack accommodating part 202, the operation of Gr.3 is restarted by releasing the rack carry-out stop. The carry-out operation of the specimen rack 4 is performed from the rack rotor 205 to the rack accommodating part 202, and the specimen rack 4 is carried to the rack accommodating part 202 by the rack transport line 203, and is carried out by the carry-out side rack extrusion mechanism 208.

The invention is not limited to the above-mentioned embodiments, and includes various modifications. For example, the above-descried embodiments are described in detail for easy understanding of the invention, and the invention is not necessarily limited to those including all the configurations described above. Further, a part of the configuration of one embodiment can be replaced with the configuration of another embodiment, and the configuration of another embodiment can be added to the configuration of one embodiment. Further, another configuration may be added to a part of the configuration of each embodiment, and the part of the configuration may be deleted or replaced with another the configuration.

Further, a part or all of the above-mentioned configurations, functions, processing units, processing sections, and the like may be implemented by hardware, for example, by designing an integrated circuit. Each of the configurations, the functions, or the like described above may be implemented by software by the processor interpreting and executing a program for implementing respective functions. Information such as a program, a table, a file, or the like for implementing the respective functions can be stored in a recording device such as a memory, a hard disk, or a solid state drive (SSD), or in a recording medium such as an IC card, an SD card, or a DVD.

Control lines or information lines indicate those that are considered to be necessary for explanation, and all the control lines or information lines necessary for a product are not always shown. In practice, it may be considered that almost all configurations are connected to each other.

REFERENCE SIGN LIST

1: reaction disk
2: reagent dispensing mechanism
3: specimen dispensing mechanism
4: specimen rack
5: specimen container
6: dispensing line
7: reagent disk
8: specimen identification device
9: rack tray handle
10: shaft
11: folded-back part
12: movable range limiting part
13: rack tray
100: analysis module
200: rack transport module
201: rack supply part
202: rack accommodating part
203: rack transport line
204: specimen identification device
205: rack rotor
205a: slot
206: rack tray
207: supply-side rack extrusion mechanism
208: carry-out side rack extrusion mechanism
209: emergency rack loading part
210: emergency specimen rack standby area
300: control device
301: control unit
302: storage unit
303: display unit
304: input unit
500: automatic analysis device

The invention claimed is:

1. An automatic analysis device, comprising:
an analysis module for quantitatively or qualitatively analyzing specific components contained in a biological specimen, including a reaction disk, a reagent disk, a dispensing line that carries in a specimen rack in which one or more specimen containers storing a specimen to be analyzed are loaded, a specimen dispensing mechanism, a reagent dispensing mechanism, and a specimen identification device;
a rack transport module that transports the specimen rack; and
a controller programmed to control operations of the analysis module and the rack transport module, wherein
the rack transport module includes:
 a rack supply part that supplies the specimen rack;
 a rack accommodating part that accommodates the specimen rack;
 a rack transport line that transports the specimen rack supplied from the rack supply part;
 the dispensing line carrying in the specimen rack in which the one or more specimen containers storing a specimen to be analyzed are loaded to the analysis module; and
 a rack rotor that transfers the specimen rack between the rack transport line and the dispensing line,
the rack supply part is configured such that the specimen rack is able to be loaded into the rack transport line using a rack tray on which a plurality of specimen racks are able to be loaded,
the rack accommodating part accommodates the specimen rack transported from the rack transport line and is able to be accommodated using the rack tray, and
the rack tray is a cantilever rack tray including a cantilever-shaped handle that allows an operator to additionally load a specimen rack from a front of the rack supply part.

2. The automatic analysis device according to claim 1, wherein
the controller controls an operation of the rack accommodating part for accommodating the specimen rack and the operation of the rack accommodating part is stoppable by the controller independently of the operation of the analysis module.

3. The automatic analysis device according to claim 1, wherein
the controller controls a supply operation of the rack supply part, and
after the supply operation of the rack supply part is stopped by the controller, the operator uses the cantilever rack tray to additionally load the specimen rack into the rack transport line.

4. The automatic analysis device according to claim 1, wherein
the controller controls an accommodating operation of the rack accommodating part, and
after the accommodating operation of the rack accommodating part is stopped by the controller, the operator uses the cantilever rack tray to accommodate the specimen rack from the rack transport line.

5. The automatic analysis device according to claim 3, further comprising:
a supply-side rack extrusion mechanism that extrudes the specimen rack from the rack supply part to the rack transport line; and
a carry-out side rack extrusion mechanism that extrudes the specimen rack from the rack transport line to the rack accommodating part, wherein
a rack tray having a same shape as the cantilever rack tray is able to be taken out from an upstream side of the supply-side rack extrusion mechanism or a downstream side of the carry-out side rack extrusion mechanism.

6. The automatic analysis device according to claim 1, wherein
the controller controls a supply operation of the rack supply part, and
after the supply operation of the rack supply part is stopped by the controller, the supply operation of the rack supply part is restarted by a manual operation of an operator or when a quantity of specimen racks detected by a sensor exceeds a predetermined threshold value.

7. The automatic analysis device according to claim 1, wherein
an operation of the rack supply part for supplying a specimen rack is stoppable independently of the operation of the analysis module.

8. The automatic analysis device according to claim 1, wherein
a handle of the cantilever rack tray is shorter than the specimen rack by one or more of the specimen containers on a side where the specimen rack is additionally loaded.

* * * * *